(12) United States Patent
Stahlin et al.

(10) Patent No.: US 9,099,001 B2
(45) Date of Patent: Aug. 4, 2015

(54) METHOD AND SYSTEM FOR REDUCING A REACTION DELAY TIME OF A VEHICLE SAFETY CONTROL DEVICE

(75) Inventors: Ulrich Stahlin, Eschborn (DE); Marc Menzel, Weimar/Lahn (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 161 days.

(21) Appl. No.: 13/825,278

(22) PCT Filed: Aug. 25, 2011

(86) PCT No.: PCT/EP2011/064617
§ 371 (c)(1),
(2), (4) Date: Mar. 20, 2013

(87) PCT Pub. No.: WO2012/038185
PCT Pub. Date: Mar. 29, 2012

(65) Prior Publication Data
US 2013/0218415 A1    Aug. 22, 2013

(30) Foreign Application Priority Data
Sep. 21, 2010 (DE) .......................... 10 2010 041 147

(51) Int. Cl.
*B60T 7/22* (2006.01)
*G08G 1/16* (2006.01)
*B60W 10/18* (2012.01)
(Continued)

(52) U.S. Cl.
CPC ................ *G08G 1/16* (2013.01); *B60W 10/18* (2013.01); *B60W 10/20* (2013.01); *B60W 30/09* (2013.01); *B60W 30/0953* (2013.01); *B60W 30/0956* (2013.01); *B60W 50/06* (2013.01); *G08G 1/163* (2013.01); *B60W 2050/0006* (2013.01)

(58) Field of Classification Search
CPC .... B60T 2201/022; B60W 30/16; G08G 1/16
USPC .................. 701/41, 70, 300–302, 96, 45, 93; 340/438, 437, 435, 436, 903, 465; 180/168, 170, 268, 271, 282; 342/70, 342/71
See application file for complete search history.

(56) References Cited

U.S. PATENT DOCUMENTS 6,278,360 B1 *  8/2001  Yanagi .......................... 340/436
7,099,764 B2 *  8/2006  Seto et al. ....................... 701/70
(Continued)

FOREIGN PATENT DOCUMENTS

DE    197 33 190 A1    2/1999
DE    101 32 386 A1    1/2003
(Continued)

OTHER PUBLICATIONS

PCT International Search Report—Dec. 5, 2011.
(Continued)

*Primary Examiner* — Dalena Tran
(74) *Attorney, Agent, or Firm* — Brinks Gilson & Lione

(57) ABSTRACT

Method for reducing a reaction delay time of a vehicle safety control device which makes interventions into the control of the vehicle as a result of a surrounding situation in which there is a risk of collision, wherein the vehicle safety control device makes a first intervention into the control of the vehicle before the surrounding situation in which there is a risk of collision is validated.

13 Claims, 3 Drawing Sheets

(51) Int. Cl.
*B60W 10/20* (2006.01)
*B60W 30/09* (2012.01)
*B60W 30/095* (2012.01)
*B60W 50/06* (2006.01)
*B60W 50/00* (2006.01)

(56) References Cited

U.S. PATENT DOCUMENTS

| | | | |
|---|---|---|---|
| 7,412,329 B2 * | 8/2008 | Urai et al. | 701/301 |
| 2006/0195231 A1 | 8/2006 | Diebold et al. | |
| 2009/0037055 A1 | 2/2009 | Danner et al. | |
| 2010/0007728 A1 | 1/2010 | Strauss et al. | |
| 2010/0063736 A1 | 3/2010 | Hoetzer | |

FOREIGN PATENT DOCUMENTS

| | | |
|---|---|---|
| DE | 102 58 617 A1 | 4/2004 |
| DE | 10 2007 039 110 A1 | 2/2007 |
| DE | 10 2007 049 249 A1 | 4/2008 |
| DE | 10 2007 042 792 A1 | 3/2009 |
| DE | 10 2008 003 205 A1 | 7/2009 |
| EP | 1 557 332 A2 | 7/2005 |
| EP | 1 379 418 B1 | 5/2009 |
| WO | WO 2009/158223 A2 | 12/2009 |

OTHER PUBLICATIONS

German Examination Report—Jun. 1, 2011.

* cited by examiner

METHOD AND SYSTEM FOR REDUCING A REACTION DELAY TIME OF A VEHICLE SAFETY CONTROL DEVICE

CROSS-REFERENCE TO RELATED APPLICATIONS

This application claims priority to German Patent Application No. 10 2010 041 147.7, file Sep. 21, 2010 and PCT/EP2011/064617, filed Aug. 25, 2011.

FIELD OF THE INVENTION

The invention relates to a method for reducing a reaction delay time of a vehicle safety control device and system.

BACKGROUND OF THE INVENTION

In the prior art, various environment detection systems for motor vehicles are known which support the driver in driving the vehicle. DE 10 2004 057 060 A1 discloses in this context a driver assistance device for detecting obstacles in its own traffic lane by means of environment sensors such as radar, lidar or camera. By comparing the relative speed to the obstacle with its own vehicle speed, it is possible to determine whether it is a stationary obstacle or a vehicle approaching its own vehicle. If necessary, the device disclosed intervenes in the steering, the braking, the engine or the transmission.

DE 10 2007 042 792 A1 describes a method for the environment monitoring of a vehicle which, apart from environment sensors, also uses vehicle-to-vehicle communication means. In order to be able to respond more quickly to a hazard situation, data of vehicles which are not recognizable to the environment sensors are also detected via the vehicle-to-vehicle communication means. For example, a beginning braking process of the vehicle in front of the preceding vehicle can thus be detected although this vehicle is hidden by the preceding vehicle and can thus not be detected by the environment sensors. His own vehicle can thus be decelerated already before the environment sensors detect a braking process of the preceding vehicle.

By this means, it is possible to reduce the hazard of a collision accident in the case of sudden braking of the preceding vehicle, e.g. in a line of traffic.

In DE 10 2007 039 110 A1, a driver assistance system is also defined which increases the attention of the driver of a vehicle by means of an advance-warning stimulus for a warning signal possibly following. If an environment sensor detects a critical situation, an advance-warning stimulus which is only insignificantly above the perception threshold of the driver is output even before the environmental situation could be reliably detected by the driver. The advance-warning stimulus is designed in such a manner that the driver does not undertake any steering or braking action on the basis of this stimulus alone. As soon as the environmental situation has been detected reliably, a warning signal is output to the driver, if necessary. Since the attention of the driver has already been enhanced by the advance-warning stimulus, he can react more quickly to the warning signal.

The disadvantage of these devices and methods known from the prior art consists in the fact that, due to the existing high safety risks, they intervene in a vehicle control system or output a warning to the driver only when an environmental situation could be validated reliably. As a result, a period of time which is important and required for avoiding an accident or at least reducing an accident may be lost. Even if, in the case of a suspicion of a hazard situation, an advance-warning stimulus is output immediately to the driver, a possibly decisive period of time passes unused until a full warning is output. The advance-warning stimulus only reduces the period of time needed by the driver for responding to the full warning. It is especially in the case of the systems gaining more and more popularity, which carry out a completely autonomous control intervention, that the response time of the driver no longer plays a role, in any case, however.

It is the object of the present invention, therefore, for avoiding a reaction delay time, in the case of detection of an environmental situation exhibiting a risk of collision, without validation of the environmental situation, to immediately perform an intervention in the vehicle control without creating a hazard for the surrounding traffic, as a result.

According to the invention, this object is achieved by the method for reducing a reaction delay time of a vehicle safety control device as and system as described herein.

INTRODUCTORY DESCRIPTION OF THE INVENTION

The method according to the invention for reducing a reaction delay time of a vehicle safety control device which performs interventions in the vehicle control due to an environmental situation exhibiting a risk of collision is characterized in that the vehicle safety control device performs a first intervention in the vehicle control before the environmental situation exhibiting the risk of collision is validated. As a result, it is possible to react very quickly to a threatening risk of collision and no reaction delay time arises as does in generic methods. This gain in time may contribute decisively to avoiding a collision or at least to weakening an unavoidable collision. By this means, the frequency of accidents in road traffic can be reduced and the gravity of unavoidable accidents reduced. In any case, the method offers a significant gain in safety in road traffic.

In the context of the present document, a risk of collision is understood to be not only the risk of a collision between two vehicles but rather any possible type of collision in which a vehicle is involved. Thus, the term relates, for example, also to the collision of a vehicle with a pedestrian, an animal, a motorized or unmotorized two-wheeler and stationary or non-stationary obstacles of any nature.

Preferably, it is provided that the vehicle control comprises the braking device and/or steering device of a vehicle. Both the braking and the steering device provide good preconditions for avoiding, or at least lessening the effect of, an impending collision by means of a vehicle intervention. In particular, the braking device offers the advantage of stopping the vehicle in front of an obstacle and of bringing it to a standstill. The steering device, in contrast, offers the advantage that an obstacle can be bypassed. A simultaneous application of braking and steering means for avoiding a collision is also possible.

In a further preferred embodiment, it is provided that the first intervention in the vehicle control is ended if the environmental situation exhibiting the risk of collision cannot be validated. As a result, the driver can regain sole control of the vehicle if the first intervention in the course of validation is found to be not necessary. Since the duration of the validation is typically within a time range of a few 100 ms, the first intervention can be rapidly ended and signifies only a comparatively small loss in driving comfort. Because of the rapid ending of an unnecessary first intervention, there is also no resultant risk for the surrounding traffic.

It is provided suitably that the first intervention in the vehicle control is performed only if the time up to the validation of the environmental situation and/or up to performing a second intervention is not sufficient for avoiding an impending accident. If the non-validated environmental situation exhibits a risk of collision and the calculated time period up to the occurrence of the collision is sufficiently long for a validation of the environmental situation and a subsequent accident-avoiding intervention in the vehicle control, no first intervention is performed. This results in the advantage that, in the case of sufficiently available reaction time, no intervention which is non-validated and may be found to be unnecessary is performed which leads to a slight loss in driving comfort.

It is also advantageous that the first intervention in the vehicle control is a slight braking intervention and/or a slight steering intervention which is/are not sufficient alone for preventing an impending accident. As a result, the time up to the validation of the environmental situation can be used already advantageously for initiating the accident avoidance or at least for accident reduction without creating a possibly unnecessary hazard for the surrounding traffic due to too strong an intervention.

In particular, it is advantageous that the slight braking intervention causes a deceleration in a range of about 0.3 g up to about 0.5 g. On the one hand, this range of deceleration is sufficient for contributing to the avoidance of an accident already in advance of full braking by removing an essential part of the kinetic vehicle energy. On the other hand, this range of deceleration is not yet great enough for creating a hazard for following vehicles due to the abrupt braking.

According to a further preferred embodiment of the invention, it is provided that the vehicle safety control device outputs a warning to the driver in addition to the first intervention in the vehicle control. This warning can be of a visual, audible or haptic type. This results in the advantage that the driver is warned already when a risk of collision is suspected before it is validated. Due to this early increase in driver attention, the driver himself is also provided with more time to react to a hazard situation.

In particular, it is preferred that the warning is output to the driver with a time delay. The time delay offers an opportunity to the vehicle safety control device to subject the non-validated signal to further processing steps before outputting a warning to the driver.

It is quite especially preferred that the time delay corresponds to the time period from performance of the first intervention up to performance of the second intervention. As a result, the environmental situation can be validated before the warning is output to the driver. The driver thus receives a reliable warning which has first been validated. As a result, unnecessary creation of uncertainty in the driver can be avoided.

It is also advantageous that the second intervention in the vehicle control is performed when the environmental situation exhibiting the risk of collision has been validated. As soon as the presence of a risk of collision has been detected and confirmed reliably, an intervention in the vehicle control which is sufficiently strong for preventing an accident can thus be carried out. If the collision is unavoidable, it is at least possible to remove a maximum possible amount of kinetic energy from the vehicle by means of full braking so that the effect of the impending collision is minimized. Furthermore, a resultant advantage is that the second intervention in the vehicle control is not carried out on the basis of a non-validated and therefore possibly not correctly detected situation. This is significant in this respect since the second intervention has a considerable influence on the vehicle control and can thus create a hazard for the surrounding traffic.

It is also preferred that the second intervention in the vehicle control is carried out adapted to the validated environmental situation exhibiting the risk of collision. This results in the advantage that the intensity of the intervention is carried out graduated to the respective requirements. Since a strong intervention can create a hazard for the surrounding traffic, this hazard can thus be limited advantageously to a minimum absolutely necessary for avoiding an accident.

In a further preferred embodiment of the invention, it is provided that the steering intervention is an addition of torque to the steering torque and/or an addition of angle to the steering angle. The driver thus always retains control over the vehicle control and thus the full responsibility. An addition of torque acts in the form of an additional torque at the steering wheel of the vehicle which is perceived by the driver as a recommendation for adapting the steering angle. If the driver does not wish to follow the recommendation, he can ignore the additional torque without particular expenditure of force. A further possibility for an addition of torque represents a change in the steering support in the case of an electrical servo-controlled steering system. An addition of angle supports a steering process of the driver in that an enlarged steering movement of the steered vehicle wheels corresponds to a slight steering movement at the steering wheel. As a result, the adjustment of a steering angle needed by the driver can be accelerated. Similarly, however, it is also possible here that the driver, by limiting the steering movement or slightly countersteering, does not follow the recommendation of the vehicle safety control device.

The method according to the invention is preferably distinguished by the fact that it is indicated to the driver whether a first intervention has been performed. This provides the driver with information about the cause of the intervention in the braking and/or steering device perceived by him. This results in the advantage that the driver does not suspect a technical defect of his vehicle to be the cause and is not made to feel uncertain.

Especially preferably, the method according to the invention is characterized by the fact that the reason why the first intervention has been performed is indicated to the driver. This provides the driver not only with the information about the performance of the intervention perceived by him but also additionally with the reason which led to the intervention. This can be, for example, the erroneous detection of the end of a traffic jam which is found to be only slow-moving traffic congestion during the environment validation. This further reduces the uncertainty of the driver due to the first intervention which may have arisen.

It is also advantageous that the environmental situation is detected by means of vehicle-to-X communication means and/or environment detection means. Both vehicle-to-X communication means and environment detection means are suitable for detecting the environment of the vehicle and provided as standard in many vehicles. The particular advantage of the environment detection means consists in the fact that they can detect the environment of the vehicle independently without having to rely on transmitters which provide the data. This allows an essentially gapless and autonomous perception of the closer environment of the vehicle. By comparison, the vehicle-to-X communication means offer the particular advantage that they can detect objects which are located outside the range of perception of the environment detection means or also of the driver.

It is especially advantageous that the environment detection means detect the environmental situation on the basis of radar and/or camera and/or lidar and/or laser. Such sensors are used already in a great number of vehicles and are suitable not only for the basic detection and recognition of an object but also provide for reliable range finding. It is only by this means that the environmental situation can be analyzed reliably for the presence of a hazard with regard to a detected object.

It is also especially advantageous that the vehicle-to-X communication means communicate on the basis of at least one of the following types of connection:
  WLAN connection (to IEEE 802.11a/b/g/n/p),
  ISM connection (Industrial, Scientific, Medical band, especially in the sub-GHz band),
  Infrared connection, and
  Mobile radio connection.

In this context, these types of connection offer different advantages and disadvantages depending on the type and wavelength. WLAN connections provide for, e.g., a high data transmission rate. However, data transmission around an obstacle is possible only to a limited extent. ISM connections, in contrast, although they offer a lower data transmission rate, also allow data to be exchanged around an obstacle in the line of sight. Infrared connections, in turn, provide a low data transmission rate which is also restricted greatly in the case of a lacking visual connection. Mobile radio connections, finally, are not impaired by obstacles in the line of sight and offer a good data transmission rate. On the other hand, setting up the connection is comparatively slow. Combining a plurality of these types of connection and using them simultaneously or in parallel results in further advantages since the disadvantages of individual types of connection can thus be compensated for.

In a further preferred embodiment of the invention, it is provided that the validation of the environmental situation exhibiting the risk of collision is performed via a further environment detection means or a further vehicle-to-X communication means. By recognizing the presence of a hazard situation by means of an additional environment sensor or by means of an additional vehicle-to-X communication means, it can be assumed with high probability that an actual hazard exists. The hazard situation can thus be classified as validated.

The method is preferably distinguished by the fact that the validation of the environmental situation exhibiting the risk of collision is performed via the environment detection means first detecting the environmental situation exhibiting the risk of collision in that the environment detection means detects the environmental situation exhibiting the risk of collision over a period of time which is sufficiently long for validation. If, for example, a camera present in the vehicle detects an object which is classified as a hazard, a validation can take place without additional sensors or vehicle-to-X communication means in that the camera detects the object over a number of operating cycles and the object is classified as a hazard with each operating cycle. Analogously, a hazard situation can be validated by means of another sensor present in the vehicle without involving further environment detection means or vehicle-to-X communication means.

The present invention also relates to a system for reducing a reaction delay time of a vehicle safety control device in which the method according to the invention is carried out. The system comprises
  Braking intervention means,
  Steering intervention means,
  Environment detection means,
  Vehicle-to-X communication means and
  A vehicle safety control device and is distinguished by the fact that the vehicle safety control device performs a first intervention in the vehicle control before an environmental situation exhibiting a risk of collision is validated.

Further preferred embodiments are found in the subclaims and the subsequent description of an exemplary embodiment, by means of figures, in which:

DETAILED DESCRIPTION OF THE INVENTION

Figure 1:
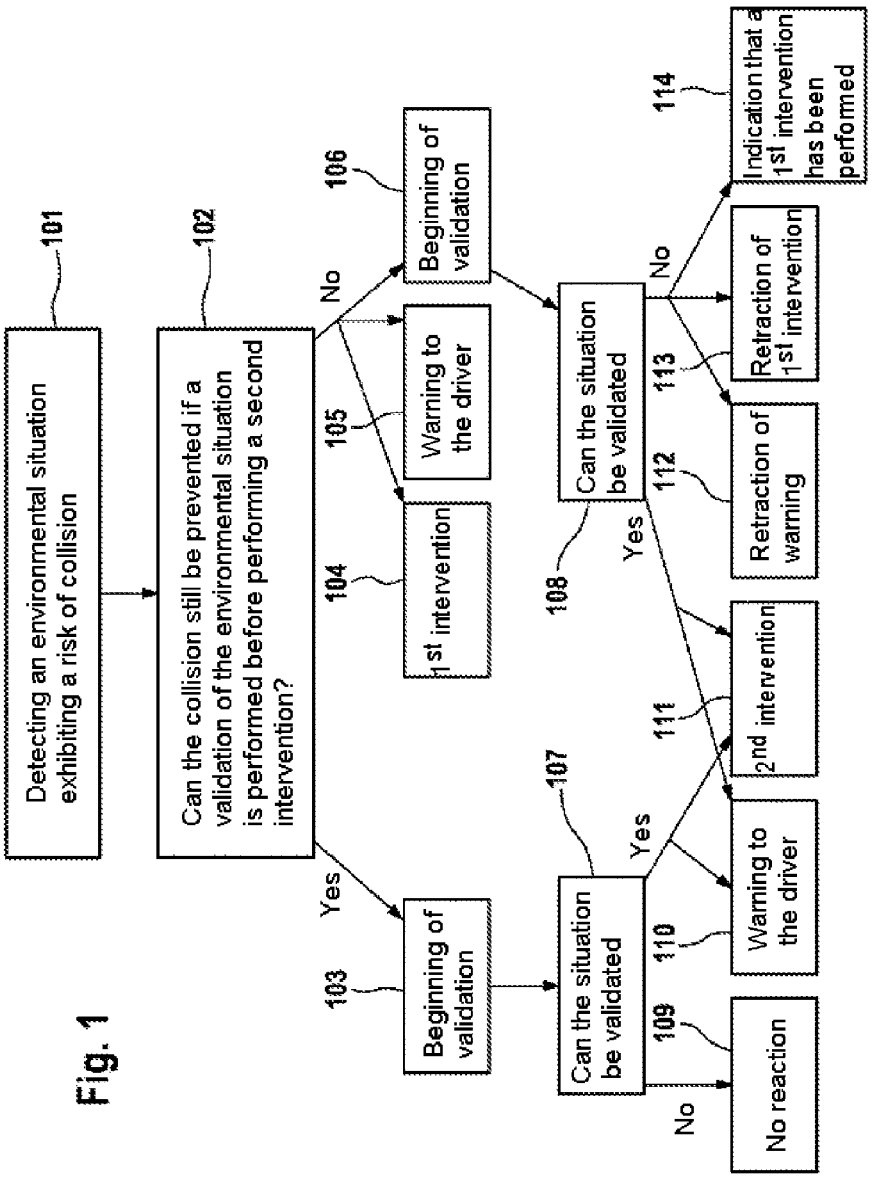
FIG. 1 shows a flowchart which represents the individual sequence steps of the method.

FIG. 1 shows the individual sequence steps of an exemplary method as a flowchart. In step 101, an environmental situation is initially detected which exhibits a risk of collision. Since the situation is not detected simultaneously by several of the available environment sensors and vehicle-to-X communication means, but initially only by one individual sensor, it is classified as not validated by the vehicle safety control device. In step 102, the vehicle safety control device analyzes the as yet non-validated environmental situation for the reaction time still available before the possibly impending collision. If the analysis shows that the available reaction time is sufficient for still avoiding the possibly impending collision even when initially a validation of the environmental situation and, following this, possibly a second intervention is carried out, the system according to the invention begins in method step 103 with the validation of the environmental situation. If, however, the vehicle safety control device detects that the reaction time still available after a validation will not be sufficient for avoiding the possibly impending collision, the system performs in step 104 a first intervention in the vehicle control. This first intervention is only a slight intervention in the braking and steering means of the vehicle which by itself is not sufficient for preventing the possibly impending collision. At the same time, a warning is output to the driver in step 105 in order to increase his attention, and, in step 106, the environment validation also necessary in this case is begun. Independently of whether a first intervention is carried out and a warning is output, it is found in steps 107 and 108, respectively, whether the environmental situation exhibiting the risk of collision can be validated. If the situation cannot be validated, the method does not perform a second vehicle intervention in step 109. Since, in this case, neither a first intervention was carried out nor has a warning been output and the driver has thus noticed nothing from the method steps running in the system, the method can be ended in step 109. If, however, the environment validation cannot confirm the presence of a risk of collision in step 108, the warning to the driver is retracted in step 112 and the first intervention is ended in step 113. In addition, it is indicated to the driver in step 114 that a first intervention has been carried out, and also the cause why a first intervention has been carried out. This contributes to calming the driver who has been unsettled by the first intervention in the vehicle control and the warning output since he has not perceived any hazard himself. If, however, the environment validation confirms the hazard detected in step 101 in method steps 107 or 108, a second intervention in the vehicle control is carried out in step 111 and a warning to the driver is output or maintained, respectively, in step 110.

The second intervention can be distinctly stronger in its intensity than the first intervention. The intensity of the second intervention in this case depends on the requirements for accident prevention.

Figure 2:
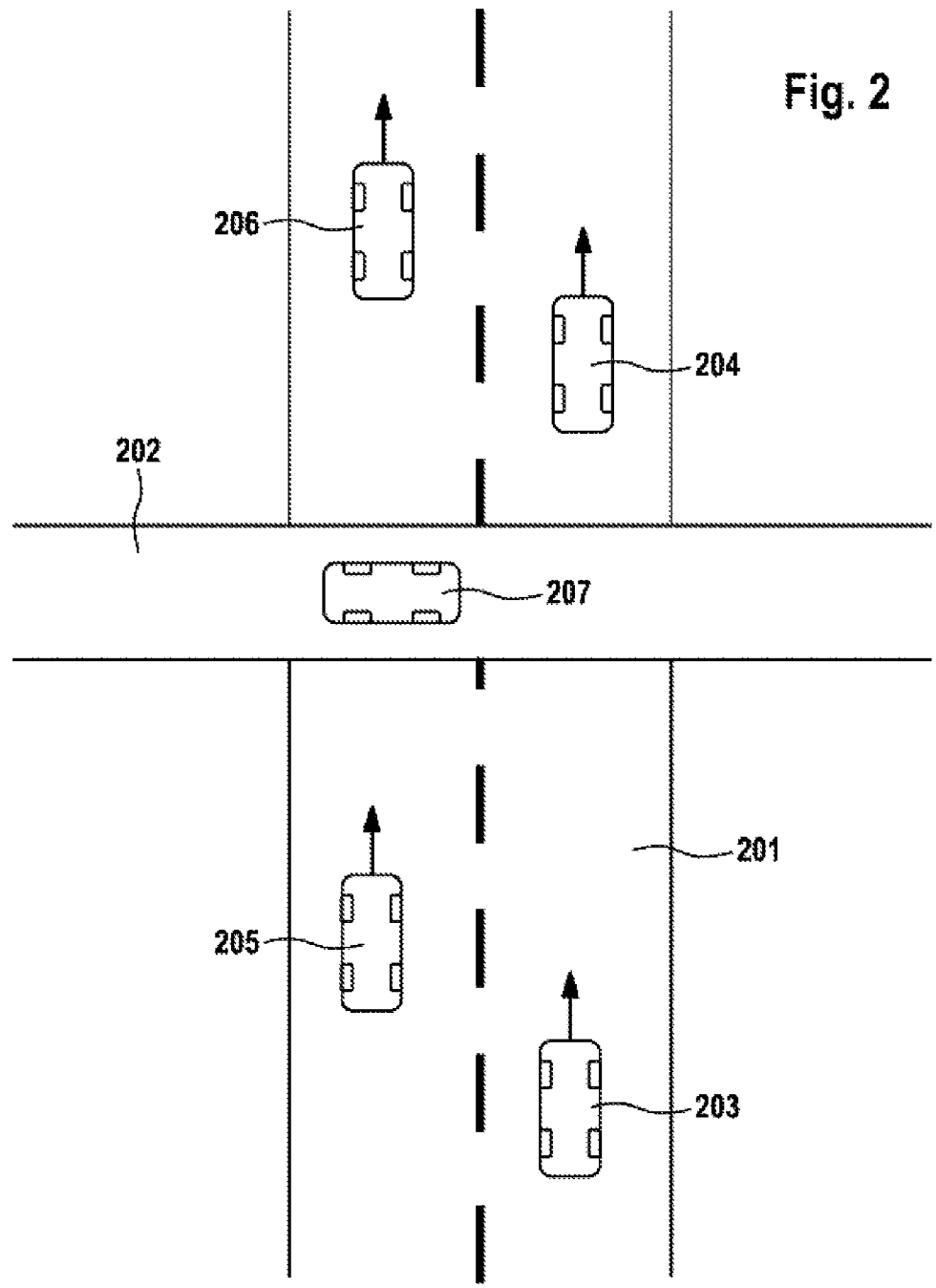
FIG. 2 shows a traffic situation on a much-traveled road on which the method according to the invention is used.

FIG. 2 shows a traffic situation on a much-traveled road 201 on which the method according to the invention is used. Road 201 has two lanes, both lanes exhibiting the same direction of travel. A bridge 202 leads over road 201. The direction of travel of the vehicles 203, 204, 205 and 206 traveling on road 201 is also shown in each case by an arrow pointing in the direction of travel. On bridge 202, there is also vehicle 207 which cannot continue to travel due to a technical defect.

Vehicle 203 has the inventive system for reducing a reaction delay time. It is also equipped with a radar-based intelligent speed control (ACC) and vehicle-to-X communication means. In this exemplary embodiment, the preceding vehicle 204 is also equipped with vehicle-to-X communication means. Since the vehicle 204 begins an unexpected and strong braking process, vehicle 203 receives information about the beginning deceleration process via the vehicle-to-X communication means. Due to this abrupt and strong deceleration process, a risk of collision arises for vehicle 203. Since the vehicle safety control device present in vehicle 203 detects that the period of time available for avoiding an accident is not sufficient for still performing a validation of the present hazard situation before initiating the second intervention, a first intervention is started immediately. The first intervention performs a braking process with a deceleration of 0.3 g. At the same time, a warning is output to the driver and the validation process for validating the environmental situation is started. Due to the first intervention, vehicle 203 is therefore decelerated slightly already during the validation in order to thus avoid or at least weaken the effect of a possibly impending collision with vehicle 204. According to the example, the validation of the environmental situation which exhibits the risk of collision is performed by the radar sensor also present in vehicle 203. Since the radar sensor can only detect a current actual distance, a certain period of time is needed for reliably detecting a change in distance and validating or rejecting the environmental situation. After 400 ms, the message received via the vehicle-to-X communication means can be confirmed by the radar sensor and the vehicle safety control device carries out a second intervention in the vehicle control. This second intervention is distinctly stronger than the first intervention and is adapted to the respective environmental requirements. In this case, the deceleration of vehicle 203 is therefore matched with the deceleration of vehicle 204 and additionally the available safety distance between the two vehicles is taken into consideration.

According to a further exemplary embodiment in FIG. 2, vehicle 205 also has a system according to the invention. In this case, the system comprises, apart from vehicle-to-X communication means, a laser sensor for measuring the distance from the preceding vehicle 206. Vehicle 205 will also drive through underneath the bridge 202 on which vehicle 207 is located above the traffic lane of vehicle 205. The technical defect on vehicle 207 also leads to an unfounded emergency braking warning specifying the position of vehicle 207 being transmitted via the vehicle-to-X communication means. In this example, the position information is transmitted in the form of GPS coordinates. Vehicle 205 receives the emergency braking warning from vehicle 207 via its own vehicle-to-X communication means and detects by means of the GPS coordinates contained in the message that vehicle 207 is located directly in front of vehicle 205. The vehicle safety control device of vehicle 205 thus detects an environmental situation which exhibits a risk of collision, and it is analyzed at first whether the possibly impending collision can be avoided if a possibly necessary braking process begins only after the situation validation. Since the analysis shows that the available residual reaction time is not sufficient for avoiding a collision, a first intervention in the vehicle braking means is performed. In consequence of the first intervention, vehicle 205 decelerates with a deceleration of 0.5 g. Whilst the first intervention is taking place and vehicle 205 is slightly decelerating, a validation of the environmental situation is performed via the laser sensor. The laser sensor needs 300 ms for checking whether a vehicle having the GPS coordinates of vehicle 207 is located on the roadway. Because the laser sensor cannot detect a corresponding object, the vehicle safety control device classifies the risk of collision as not validated. The first intervention is therefore retracted and a second intervention is not performed. Since, in this exemplary embodiment, no warning has been output to the driver, no warning needs to be retracted, either. In order to not unsettle the driver, who has perceived the first intervention in the form of a suddenly beginning slight jolt, a display in the vehicle shows him that the first intervention has taken place and why the first intervention has taken place. Due to the fact that only a slight braking process of 300 ms duration has been performed, no hazard situation is created, either, for any vehicles following.

A further exemplary embodiment is also shown in FIG. 2. Vehicle 205 is driving behind vehicle 206. Both vehicles have vehicle-to-X communication means. Vehicle 205 also has a laser sensor for measuring the distance from the preceding vehicle 206. The driver of vehicle 206 suddenly brakes unexpectedly since he perceives an obstacle, not shown in FIG. 2, in front of him on the roadway. Even before the desired deceleration occurs, vehicle 206 sends an emergency braking warning via the vehicle-to-X communication means present in the vehicle. This emergency braking warning is received by vehicle 205 whereupon the vehicle safety control device detects an non-validated risk of collision. Since the calculated remaining reaction time allows enough of a margin for a validation without immediate first intervention, only a situation validation is initially performed by means of the laser sensor.

No first intervention takes place and no warning is output to the driver in order to not unnecessarily unsettle the driver. The laser sensor detects within 300 ms that vehicle 206 is decelerating severely. The vehicle safety control device thus classifies the risk of collision as validated and conducts a second intervention in the vehicle braking means without first having performed the first intervention. At the same time, a warning is output to the driver. Due to the second intervention, vehicle 205 comes to a standstill with sufficient safety distance from vehicle 206.

Figure 3:
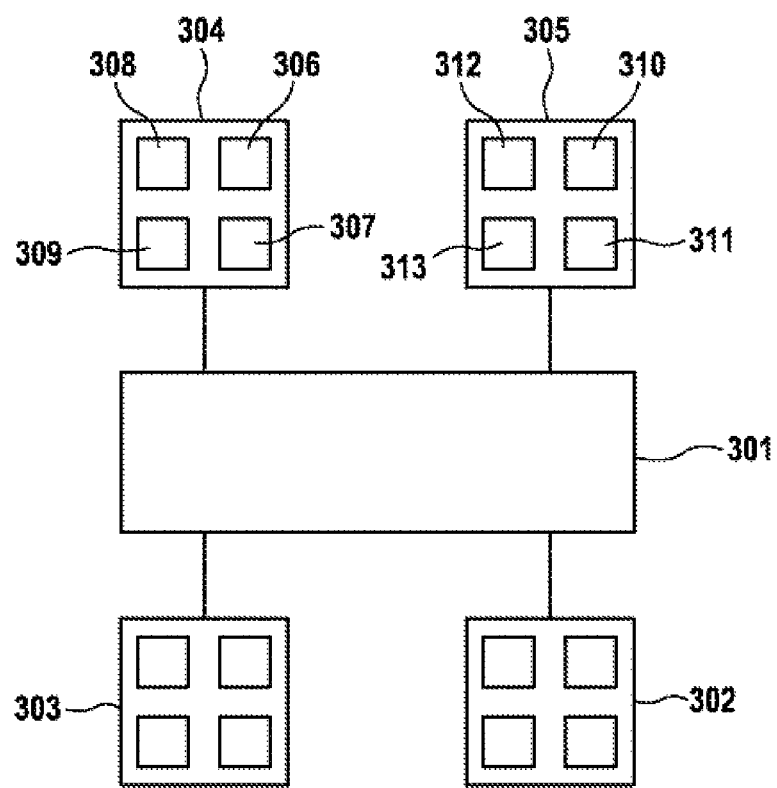
FIG. 3 shows diagrammatically the structure of a system according to the invention.

FIG. 3 shows an exemplary embodiment of the system according to the invention. Vehicle safety control device 301 is connected to steering intervention means 302 and braking intervention means 303. Via the connections, vehicle safety control device 301 can perform steering and/or braking interventions. Vehicle safety control device 301 is also connected to environment detection means 304 and vehicle-to-X communication means 305. These connections are used for transmitting environmental situation data to vehicle safety control device 301. In this exemplary embodiment, the environment detection means 304 comprise lidar sensor 306, camera sensor 307, radar sensor 308 and laser sensor 309. The vehicle-to-X communication means 305 comprise WLAN communication means 310, ISM communication means 311, infrared communication means 312 and mobile radio communication means 313.

While the above description constitutes the preferred embodiment of the present invention, it will be appreciated that the invention is susceptible to modification, variation and change without departing from the proper scope and fair meaning of the accompanying claims.

The invention claimed is:

1. A method for reducing a reaction delay time of a vehicle safety control device which performs interventions in a vehicle control due to an environmental situation exhibiting a risk of collision, the vehicle safety control device capable of performing a first intervention and a second intervention in the vehicle control to reduce the risk of collision, the second intervention having a higher magnitude than the first intervention, the method comprising:
   detecting, via the vehicle safety control device, an environmental situation exhibiting a risk of collision,
   beginning a validation of the environmental situation and performing, via the vehicle safety control device, the first intervention in the vehicle control before completing the validation of the environmental situation exhibiting a risk of collision;
   wherein the vehicle control comprises a braking device and a steering device, and the first intervention in the vehicle control is a slight braking intervention in the braking device or a slight steering intervention in the steering device which is not intended to be sufficient alone for preventing an impending collision.

2. The method as claimed in claim 1 further comprising, ending the first intervention in the vehicle control if the environmental situation exhibiting a risk of collision is not validated.

3. The method as claimed in claim 1 further comprising:
   determining a period of time available for avoiding the collision; and
   detecting that the period of time available for avoiding the collision is not sufficient for performing a validation of the environmental situation before initiating the second intervention and, in response thereto, performing the first intervention in the vehicle control.

4. The method as claimed in claim 3 further comprising performing the second intervention in the vehicle control when the environmental situation exhibiting a risk of collision has been validated via an environmental detection device or a vehicle-to-X communication device of the vehicle safety control device.

5. The method as claimed in claim 1 further comprising the vehicle safety control device outputting a warning to the driver in addition to performing the first intervention in the vehicle control.

6. The method as claimed in claim 1 wherein the steering intervention is an addition of torque to a steering torque or an increase of angle to a steering angle.

7. The method as claimed in claim 1 further comprising indicating to the driver whether a first intervention has been performed.

8. The method as claimed in claim 1 further comprising detecting the environmental situation on the basis of receiving a signal from a vehicle-to-X communication device or an environment detection device.

9. The method as claimed in claim 8, further comprising detecting the environmental situation on the basis of receiving a signal from at least one of a radar, a camera, a lidar, and a laser.

10. The method as claimed in claim 8, further comprising in that the vehicle-to-X communication device communicating on the basis of receiving a signal via at least one of the following types of connection:
    a WLAN connection,
    an ISM connection,
    an infrared connection, and
    a mobile radio connection.

11. The method as claimed in claim 8 further comprising performing the validation of the environmental situation exhibiting a risk of collision via the environment detection device first detecting the environmental situation exhibiting a risk of collision in that the environment detection device detects the environmental situation exhibiting a risk of collision over a period of time which is sufficiently long for validation.

12. The method as claimed in claim 1 further comprising performing validation of the environmental situation exhibiting a risk of collision via receiving a signal from an environment detection device or a vehicle-to-X communication device.

13. A system for reducing a reaction delay time of a vehicle safety control device comprising:
    a vehicle control in the form of at least one of a braking intervention device and a steering intervention device,
    an environment detection device,
    a vehicle-to-X communication device,
    a vehicle safety control device, the vehicle safety control device, the vehicle safety control device capable of performing a first intervention and a second intervention in the vehicle control to reduce the risk of collision, the second intervention having a higher magnitude than the first intervention, the vehicle safety device configured to detect an environmental situation exhibiting a risk of collision and to begin a validation of the environmental situation and to perform a first intervention in the vehicle control before validation of the environmental situation exhibiting a risk of collision is completed, wherein the first intervention is a slight braking intervention in the braking intervention device or a slight steering intervention in the steering intervention device which is not intended to be sufficient alone for preventing an impending collision.

* * * * *